April 22, 1952 R. R. SCOVILLE 2,594,078
ELECTRONIC MARKER FOR CATHODE-RAY INDICATOR TUBES
Filed March 30, 1946
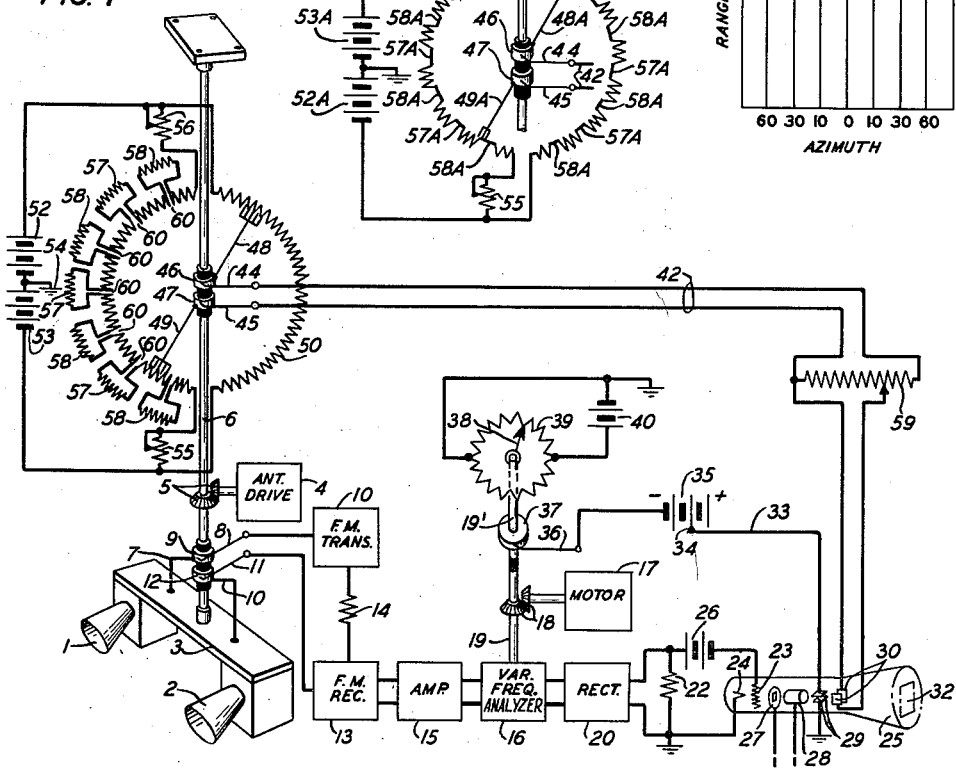
INVENTOR
R. R. SCOVILLE
BY
N. A. Ewing
ATTORNEY Patented Apr. 22, 1952

2,594,078

UNITED STATES PATENT OFFICE 2,594,078

ELECTRONIC MARKER FOR CATHODE-RAY INDICATOR TUBES

Ray R. Scoville, Glendale, Calif., assignor to Bell Telephone Laboratories, Incorporated, New York, N. Y., a corporation of New York Application March 30, 1946, Serial No. 658,554

7 Claims. (Cl. 343—10)

This relates in general to electrical control circuits and in particular to the production of electronic calibration lines on the screen of a cathode ray indicator tube.

Broadly, the object of this invention is to provide a superior technique for correlating electronic calibration marks on a cathode ray indicator screen with preselected positions of a moving member.

A more specific object of this invention is to simplify the circuits utilized in radio object locating or direction finding systems for producing calibration marks on a cathode ray indicator screen such as might be employed to accurately determine the azimuth position of a body in space in terms of the position of its reflected signal on the screen.

Additional objects may be understood from a study of the attached drawings and the description relating thereto as hereinafter set forth.

The invention will be described with reference to its embodiment in radio object locating and direction finding systems which utilize cathode ray tube indicators wherein it is necessary to employ some means to correlate the directional position of the scanning antenna beam with the displacement of the trace on the indicator screen.

Assume, for example, that in an object locating system it is desired to have the oscilloscope beam trace a pattern which represents a plot of the ranges of detected objects against their positions in azimuth. One prior art method of bringing about this result is as follows. Since it is desired to impart to the oscilloscope beam a horizontal to and fro motion on the screen, the magnitude and sense of which corresponds to the azimuth sweep of the antenna beam, the horizontal sweep circuit of the oscilloscope is connected to a source of voltage which varies in synchronism with the azimuth antenna drive. This may comprise a circular rheostat connected across a constant direct current source of power and having a wiper mechanically coupled to the rotating antenna shaft, the varying voltage output therefrom being impressed across the vertical plates of the oscilloscope. Thus, during the course of the antenna scanning cycle, the horizontal sweep voltage varies cyclically from a maximum negative to a maximum positive value and vice versa. Simultaneously, there is impressed across the horizontal plates of the oscilloscope a voltage having a frequency of oscillation which is dependent on the range of operation of the object locating system and which is many hundreds of times the frequency of the horizontal sweep variations. Thus, during each cycle, the electron beam is driven substantially progressively in a horizontal direction across the screen in synchronism with the movement of the scanning antenna, and at the same time it is displaced repeatedly at a high cyclical rate in the vertical direction. This causes the luminous spot to vertically scan the fluorescent screen producing a series of contiguous vertical straight line patterns, each of which is slightly displaced in a horizontal direction with respect to the pattern immediately preceding. Since the vertical scanning motion of the electron beam is rapid, the successive patterns closely spaced, and the intensity of the beam regulated to a low intensity by means of a control grid bias, the fluorescent screen appears to the eye to glow dimly with a uniform light. Reflected signals returning from objects in the field through the conventional signal receiving apparatus modify the potential on the control grid in the oscilloscope thus causing spots of relatively high luminosity to appear on the screen which represent the locations of detected objects in range and azimuth.

As pointed out in the above-stated objects, in accurately locating bodies in space or determining directions, the further problem arises of providing suitable means for calibrating the oscilloscope screen in terms of preselected antenna scanning angles. In place of the complex prior art circuits developed for the purpose of producing electronic calibration lines on the cathode ray indicator screen, the present invention envisions a simple modification of the horizontal sweep circuit of the system described in the foregoing paragraph. This comprises introducing means in the oscilloscope control circuits to momentarily alter the progress of the rapid scanning motion of the electron beam at preselected points in the cycle of the scanning antenna or other periodically moving body.

In accordance with one embodiment of the present invention, elements of high resistance are inserted at preselected points on the circular rheostat which, in combination with a constant potential source, furnishes the horizontal sweep voltage across one pair of oscilloscope deflecting plates. By virtue of this device, the horizontal sweep voltage, instead of increasing or decreasing uniformly in accordance with the antenna position, rises sharply whenever the rheostat wiper moving in synchronism with the rotating antenna shaft passes over the junction at which high resistance elements are inserted. The horizontal rate of movement of the vertically scanning luminous spot on the oscilloscope screen is thus momentarily accelerated at each such position causing a dark gap or line to appear between successive vertical scanning traces. This gives rise to a pattern of dark line vertical calibration marks which correspond to designated antenna positions in azimuth.

In accordance with another embodiment, elements of low resistance are inserted at spaced intervals in the rheostat of the horizontal sweep circuit. Whenever the synchronously moving rheostat wiper comes in contact with such a low resistance element the horizontal sweep voltage output is momentarily held constant whereby the luminous spot is constrained to trace repeatedly for a short time interval the same vertical path on the oscilloscope screen thus marking the said position by means of a relatively bright vertical marker line.

A better understanding of the present invention may be had from a study of the detailed description as set forth hereinafter and the accompanying drawings, in which:

Fig. 1 shows an object locating and direction finding system such as disclosed in Patent 2,581,-847, issued January 8, 1952, by L. Espenschied and J. G. Chaffee, which has been modified in accordance with the present invention by the introduction at spaced intervals of elements of relatively high resistance in the rheostat of the horizontal sweep producing circuit;

Fig. 2 shows a plot of the horizontal sweep voltage in the receiver oscilloscope against the azimuth angle of the antenna of Fig. 1;

Fig. 3 shows the series of azimuth marker lines which appear on the oscilloscope screen in the plot of range against azimuth in the system of Fig. 1;

Fig. 4 shows an alternative embodiment of the present invention in which elements of low resistance in the rheostat of the horizontal sweep producing circuit replace the elements of high resistance in the embodiment of Fig. 1, and Fig. 5 shows a plot of the horizontal sweep voltage against azimuth antenna angle in the alternative system disclosed in Fig. 4.

As stated hereinbefore all of the components of the radio object locating and direction finding system disclosed in Fig. 1 of the drawings, excepting the horizontal sweep circuit of the cathode ray oscilloscope which is modified in accordance with the present invention, are substantially similar to corresponding components of the system disclosed in Patent 2,581,847 to L. Espenschied and J. G. Chaffee.

The system of Fig. 1 comprises a pair of aligned directional transmitting and receiving electromagnetic radiators 1 and 2 respectively, which may comprise directional horns as shown or one of the several types of directional antenna arrays well known in the art. These are mounted in a housing 3 which is adapted to be rotated by means of the antenna drive 4 operating through the gears 5 on the shaft 6.

The transmitting horn 1 is connected through contact 9' attached to the slip ring 9 and brush 8 riding thereon to the circuit of the frequency modulating transmitter 10, the operation of which is substantially as described in a paper entitled "A Terrain Clearance Indicator" by L. Espenschied and R. C. Newhouse, Bell System Technical Journal, volume XVIII, January 1939.

The receiving horn 2 whose function it is to receive freqency modulated signals reflected from objects in the field is connected through contact 12' rigidly attached to the slip ring 12 and the brush 11 riding thereon to the frequency modulation receiving circuit 13. The frequency modulation receiver 13 is adapted to directly receive a reduced output component of the signal transmitted from the frequency modulating transmitter 10 through a circuit which includes a high impedance element 14. The difference or beat frequency resulting from the two input frequencies simultaneously impressed on the receiver 13, namely, the outgoing signal conducted directly from the transmitter 10 through the impedance 14, and the signal reflected from an object in the field, and received through the receiving antenna 2, is passed through a conventional amplifier 15 to the circuit of the variable frequency analyzer 16. This apparatus is driven by means of the motor 17 acting through the gears 18 on the shaft 19 to select continuously changing frequencies which sweep back and forth over a range corresponding to the range of distances over which the radio object locating and direction finding system is adapted to operate. Thus, a signal from the receiver 13, after selection by the variable frequency analyzer 16 is led through the rectifying circuit 20 and impressed across the high resistance 22 which is connected between the circuit of the control grid 23 and the cathode 24 of the cathode ray oscilloscope 25. The bias imposed on the electron beam of the cathode ray oscilloscope 25 by means of the negative biasing battery 26 is thus reduced momentarily, thereby causing a spot of increased luminosity to appear on the fluorescent screen 32 in a position corresponding to the range and azimuth position of the distant object in a manner explained by L. Espenschied and J. G. Chaffee in Patent 2,581,847, and hereinafter.

The cathode ray oscilloscope 25, which is a conventional type, includes intensifying and focusing electrodes 27 and 28 and horizontal and vertical pairs of electrostatic deflecting plates 29 and 30 whose function it is to control the position of the luminous spot on the fluorescent screen 32 in accordance with the azimuth position of the scanning antenna 1, 2 and the ranging operation of the object locating and direction finding system, as explained hereinafter.

The rapid vertical oscillatory motion of the luminous spot on the cathode ray screen 32, the rate of which corresponds to the range of operation over which the object locating and direction finding system is adapted to receive reflected signals from the objects in the field, may be under control of a circuit of the following type.

One of the pair of horizontal plates 29 which controls the vertical sweep of the electron beam is connected to ground while the other plate is connected through a circuit which includes the adjustable contact 34, the positive potential source 35, the brush 36 riding on the slip ring 37, the conducting shaft 19', and the wiper 38 riding on the circular rheostat 39 which is connected across the direct current power source 40. The wiper 38 is adapted to be driven by the motor 17 operating through the gears 18 and the shaft 19, 19', to move around the circular rheostat 39 so that an oscillatory voltage which varies synchronously with the frequency sweep of the variable frequency analyzer 16 is impressed across the horizontal plates 29.

A circuit designed to control the horizontal sweep of the oscilloscope beam in synchronism with the azimuth sweep of the scanning antenna in a system as described may have the following components:

The vertical plates 30, which control the horizontal sweep of the electron beam on the fluorescent screen 32, are connected by means of a circuit which includes the lead wires 42, and the brushes 44 and 45 riding on the slip rings 46 and 47 respectively, to the respective wipers 48 and 49. With the rotation of the shaft 6, the wipers 48 and 49, which are rigidly attached thereto, ride on the circular rheostat 50 which is connected across two 200-volt batteries 52 and 53 in series, the junction 54 of said batteries being grounded. In order to facilitate centering the trace on the indicator screen 32, the adjustable 2000-ohm resistors 55 and 56 are included in the circuit of the rheostat 50.

In accordance with the present invention, azimuth marker lines are produced electronically on the screen 32 of the cathode ray oscilloscope by the following modification of the horizontal sweep circuit. Bunched resistance elements 57 and 58 are inserted at spaced intervals in the winding of the voltage dividing circuit 50 in such a manner as to secure sharp rises in the output voltage across the lead wires 42 at designated positions of the scanning antenna 1—2, for example, the broadside position, designated as 0 degrees, and ±10, 30 and 60 degrees in azimuth. It is important that the junction wires 60, whereby the resistance elements 57 and 58 are inserted in the circuit of the rheostat 50, shall be closely enough spaced in accordance with the width of the contact brush 49 that some part of the brush is continuously in contact with the rheostat winding. The brush 49 does not come directly in contact with the resistance elements 57 and 58.

Assuming that the scanning antenna array 1—2 moves horizontally to and fro through an angular sector of 180 degrees, the brushes 48 and 49 are thereby caused to move around in contact with the circular rheostat 50 so that the output voltage impressed on the attenuating voltage divider 59 is varied from zero when the antenna array 1—2 is in broadside position to a maximum positive or negative value when the array is in one of the positions at right angles to the broadside position. In the apparatus of Fig. 1, in which the rheostat 50 is connected across the series connected 200-volt batteries 52 and 53, the maximum positive or negative output voltage realized is approximately 750 volts. Thus, as the antenna array 1—2 moves back and forth through a horizontal arc of 180 degrees, the vertical plates 30 assume alternately positive and negative potentials, the direction of the electrostatic field being progressively reversed between them, thus sweeping the electron beam of the cathode ray oscilloscope 25 slowly back and forth across the fluorescent screen 32. In a conventional cathode ray oscilloscope such as described, a typical value for the potential difference between the plates 33 for maximum sweep of the electron beam is 490 volts. It is therefore necessary to introduce the attenuating voltage divider 59 into the circuit in order to reduce the maximum output voltage across the rheostat 50 to this value.

In the course of the azimuth scanning motion of the antenna array 1—2, whenever the brush 49 passes over one of the junctions 60 on the rheostat 50, the output voltage impressed on the plates 30 rises sharply, as shown graphically in Fig. 2, in which the output voltage across the leads 42 is plotted against the azimuth angle of the antenna.

As described hereinbefore, the rapid vertical oscillations imposed on the electron beam of the oscilloscope 25 by the horizontal plates 29 are under control of the rheostat 39 connected across the constant potential source 40, the wiper 38 being driven by the motor 17 which also drives the variable frequency analyzer 16. The frequency of the vertical oscillations of the electron beam of the cathode ray tube 25 is therefore determined in accordance with the range over which the radio object locating and direction finding system described herein is adapted to operate.

When the horizontal motion imposed on the electron beam by the vertical plates 30 is superposed on the vertical motion imposed on the beam by the horizontal plates 29, a series of vertical scanning lines is progressively traced on the screen, the vertical motion of the electron beam being so rapid and the intensity of the beam so regulated that the screen gives the appearance of a uniform glow if the scanning lines are uniformly spaced. However, the presence of the bunched resistance elements 57 and 58 in the azimuth voltage divider 50, brings about sharp rises in the horizontal sweep voltage at designated points, as described above, thereby causing appreciable gaps between successive vertical scanning lines traced on the screen 32 which give the appearance of dark lines. Figure 3 of the drawings shows the pattern of azimuth marker lines appearing on the screen in a plotting of range against antenna azimuth angle when the bunched resistance elements 57 and 58 are placed in positions corresponding to 0 degrees, ±10 degrees, 30 degrees and 60 degrees in azimuth.

In the circuit of Fig. 1, assume that the total resistance of the circular rheostat 50 is 50,000 ohms, and that the horizontal extent of the pattern on the screen 32 of the cathode ray oscilloscope 25 is 1⅝ inches. Then a typical value for the inserted resistance elements 57, in order to produce dark calibration lines having a width of 12 mils on the screen 32 at azimuth angles 0 degrees and ±30 degrees, is 770 ohms. If it is desired to have marker lines at ±10 degrees and ±60 degrees which are 6 mils wide, the resistance 58 inserted at these points will be approximately 385 ohms.

A variation of the present invention is shown in Fig. 4 of the drawings, in which the high resistance elements 57 and 58 of the rheostat 50 are replaced with low resistance elements 57A and 58A which, however, are so positioned that the contact brushes 48A and 49A pass directly and in contact with them when moving around the rheostat 50. Moreover, the arcuate extent of each of the elements 57A and 58A relative to the width of the brushes 48A and 49A is such that brushes passing thereover maintain contact with these elements exclusively for a short but appreciable interval. The other components of the rheostat 50 together with the batteries 53A and 52A are similar in function and structure to corresponding components described above with reference to Fig. 1 of the drawings; and the leads 42 of the circuit of Fig. 4 may be assumed to be connected across the voltage divider 59 in the same manner as in the system of Fig. 1. As the brushes 48A and 49A move over a pair of corresponding low resistance elements 57A or 58A making contact therewith, the voltage output across the leads 42, which is impressed on the voltage divider 59, does not change appreciably until the brushes reach the ends of the elements. Fig. 5 of the drawings shows a plot of the output voltage produced by the system of Fig. 4 across the voltage divider 59 against the azimuth scanning angle of the antenna array 1—2.

Instead of the dark line system of azimuth calibration marks, shown in Fig. 3 of the drawings, and produced by the system described with reference to Fig. 1, the modified system disclosed in Fig. 4 produces a series of bright line calibration marks.

As explained hereinbefore, the electron beam vertically scans the fluorescent screen 32 under control of the rapidly oscillating vertical sweep voltage superposed on the progressively increasing and decreasing horizontal sweep voltage.

During intervals in which the brushes 48A and 49A are moving over one of the pairs of low resistance elements 57A or 58A, the luminous spot tends to move repeatedly over the same vertical scanning line of the screen 32, thereby causing a relatively bright line to appear. A system of bright azimuth lines is thus produced on the screen 32, the positions of which are correlated with the azimuth positions of the elements 57A and 58A and hence desired azimuth positions of the antenna 1—2.

Although the present invention has been described as adapted for use in an object location and direction finding system employing electromagnetic waves in the form of frequency modulated signals, it is equally applicable to radio ranging and directional systems employing electromagnetic pulses, or other types of electromagnetic signals known in the art. The present invention is not limited to the use of the particular apparatus or system of the present disclosure.

What is claimed is:

1. In a radio system which comprises in combination transmitting means, receiving means, an antenna connected to said transmitting and said receiving means, said antenna having a driving means attached thereto through a drive shaft, a cathode ray tube connected to said receiving means, said tube having a source of a beam of electrons, an indicator screen disposed in the path of said beam, and a sweep circuit connected to control the motion of said beam on said screen, a source of power, and a voltage divider connected between said source of power and said sweep circuit, said voltage divider comprising a resistor and a contact which moves on said resistor in synchronism with the movement of said antenna drive shaft, means for producing electronic marker lines on said indicator screen which comprise irregularities in the resistance characteristic at spaced intervals on the resistor of said voltage divider.

2. A system as characterized in claim 1 in which said irregularities comprise elements having relatively higher resistance per unit length than that of intervening portions of said voltage divider.

3. A system as characterized in claim 1 in which said irregularities comprise elements having relatively lower resistance per unit length than that of intervening portions of said voltage divider.

4. A radio system comprising in combination a cathode ray tube having a source of a beam of electrons, an indicator screen disposed in the path of said beam, and a sweep producing circuit connected to control the motion of said beam on said screen, a cyclically moving member, a source of power, means comprising a voltage divider under control of said cyclically moving member and connected to said sweep producing circuit and said source of power to vary the position of the indication produced by said beam on the indicating screen in accordance with the position of said cyclically moving member, and means comprising irregularities in the resistance of said voltage divider to produce electronic calibration marks on said indicator screen.

5. In a radio system including a scanning antenna, an antenna driving means, and a cathode ray indicator tube having a source of a beam of electrons, an indicator screen disposed in the path of said beam, and a sweep circuit connected to control the motion of said beam on said screen, a source of power, a voltage divider, the input of said voltage divider connected across said source of power, said voltage divider mechanically coupled to said antenna drive and having an output which varies in accordance with the position of said antenna, the output of said voltage divider electrically connected across said sweep circuit, and means comprising irregularities in the resistance of said voltage divider for producing electronic markers on said indicator screen.

6. In combination with a cyclically moving body, an oscilloscopic system including a cathode ray tube having a luminescent screen, and means for producing a ray of energy directed to impinge on said screen, a first ray deflecting means comprising a mechanism repeatedly operative through a cycle of movement substantially in synchronism with the cyclical movement of said body for moving the ray in one direction across said screen a second ray deflecting means for simultaneously moving said ray at a many times greater cyclical rate in another direction across said screen, and means comprising irregularities at the same pre-selected positions in each operative cycle of said first ray deflecting means for momentarily altering the rate of movement of said ray in said one direction whenever said body assumes said preselected positions in its cycle of movement, whereby a correspondence is established between said positions and particular positions on said screen.

7. A system comprising in combination a signal receiver including scanning means operative through a repetitive cycle to continually change the direction of radiant action of said receiver whereby a preselected area is continually scanned to locate signals, a cathode-ray indicator tube connected to said receiver for indicating the location of said signals, said tube including a luminescent screen, means for producing a ray of energy directed to impinge on said screen, a first ray deflecting means comprising a mechanism operative through a cycle of movement substantially in synchronism with said scanning means for repeatedly moving the ray at a smooth rate of speed in a first direction across said screen, and a second ray deflecting means for repeatedly moving the ray in a second direction across said screen, the motion of said ray in said second direction having a cyclical rate which is many times greater than the cyclical rate of the motion of said ray in said first direction, and means comprising irregularities at the same preselected positions in each operative cycle of said ray deflecting means for momentarily altering the smooth rate of speed of said ray in said first direction whenever said scanning means assumes said preselected positions in its cycle, whereby a correspondence is established between said positions and particular positions on said screen.

RAY R. SCOVILLE.

REFERENCES CITED

The following references are of record in the file of this patent:

UNITED STATES PATENTS

| Number | Name | Date |
|---|---|---|
| 2,172,552 | Tringham | Sept. 12, 1939 |
| 2,231,929 | Lyman | Feb. 18, 1941 |
| 2,283,951 | Ripley | May 26, 1942 |
| 2,410,666 | Peck | Nov. 5, 1946 |
| 2,422,182 | Bryant | June 17, 1947 |
| 2,423,518 | Rhea | July 8, 1947 |
| 2,453,502 | Dimmick | Nov. 9, 1948 |